United States Patent [19]
Barows et al.

[11] 3,742,689
[45] July 3, 1973

[54] ROWLESS CROP HARVESTER

[75] Inventors: Arthur G. Barows, Downers Grove; Edward W. Parrish, Clarendon Hills, both of, Ill.

[73] Assignee: International Harvester Company, Chicago, Ill.

[22] Filed: Nov. 18, 1971

[21] Appl. No.: 199,949

[52] U.S. Cl. .................................. 56/226, 171/56
[51] Int. Cl. ............................................ A01d 57/02
[58] Field of Search ......................... 56/219, -226, 56/DIG. 1; 214/83 R, 83.32; 171/52, 53, 54, 56

[56] References Cited
UNITED STATES PATENTS

| 907,966 | 12/1908 | Campbell | 56/226 |
| 2,496,002 | 1/1950 | Douglas | 56/226 |
| 1,719,871 | 7/1929 | Burts | 171/56 |
| 2,202,433 | 5/1940 | Schumacher | 171/56 |
| 3,548,950 | 12/1970 | Phelan | 171/56 |
| 2,609,648 | 9/1952 | Larson | 171/52 |

Primary Examiner—Antonio F. Guida
Attorney—Floyd Harman

[57] ABSTRACT

A non-row sensitive harvester adaptable for use on row and broadcast planted crops, the apparatus having a rotatable reel auger in one embodiment and a disk reel in another embodiment comprising a plurality of disk-like crop-penetrating gathering heads movable in a cyclic path relative to the ground, each of the heads having mounted thereon gathering elements which grasp and sweep the crops over a cutter, rotation of the reel and the actuation of the gathering elements being selectively adjustable to affect the operating characteristics of the harvester so that it is adaptable to a plurality of crops and situations.

19 Claims, 24 Drawing Figures

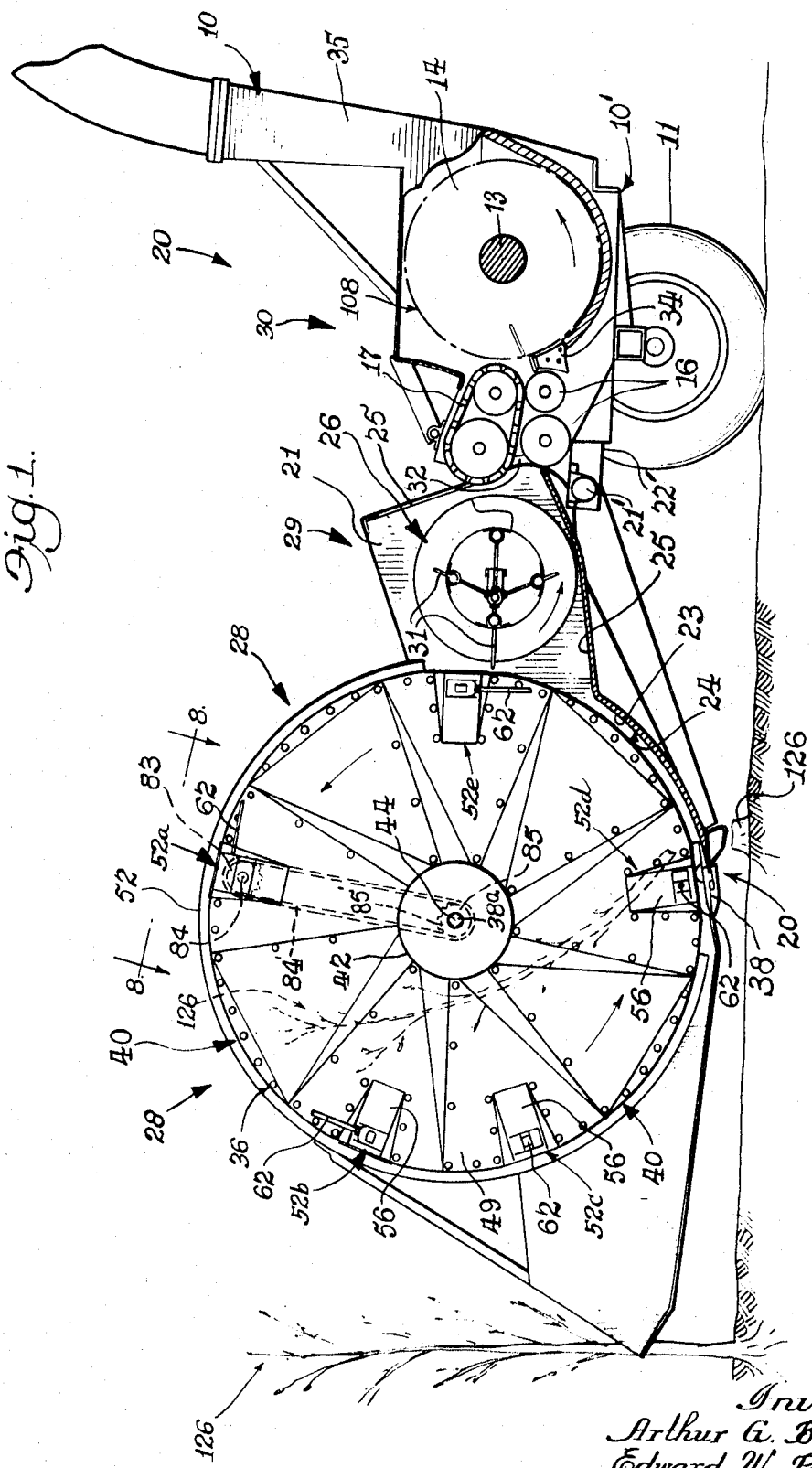

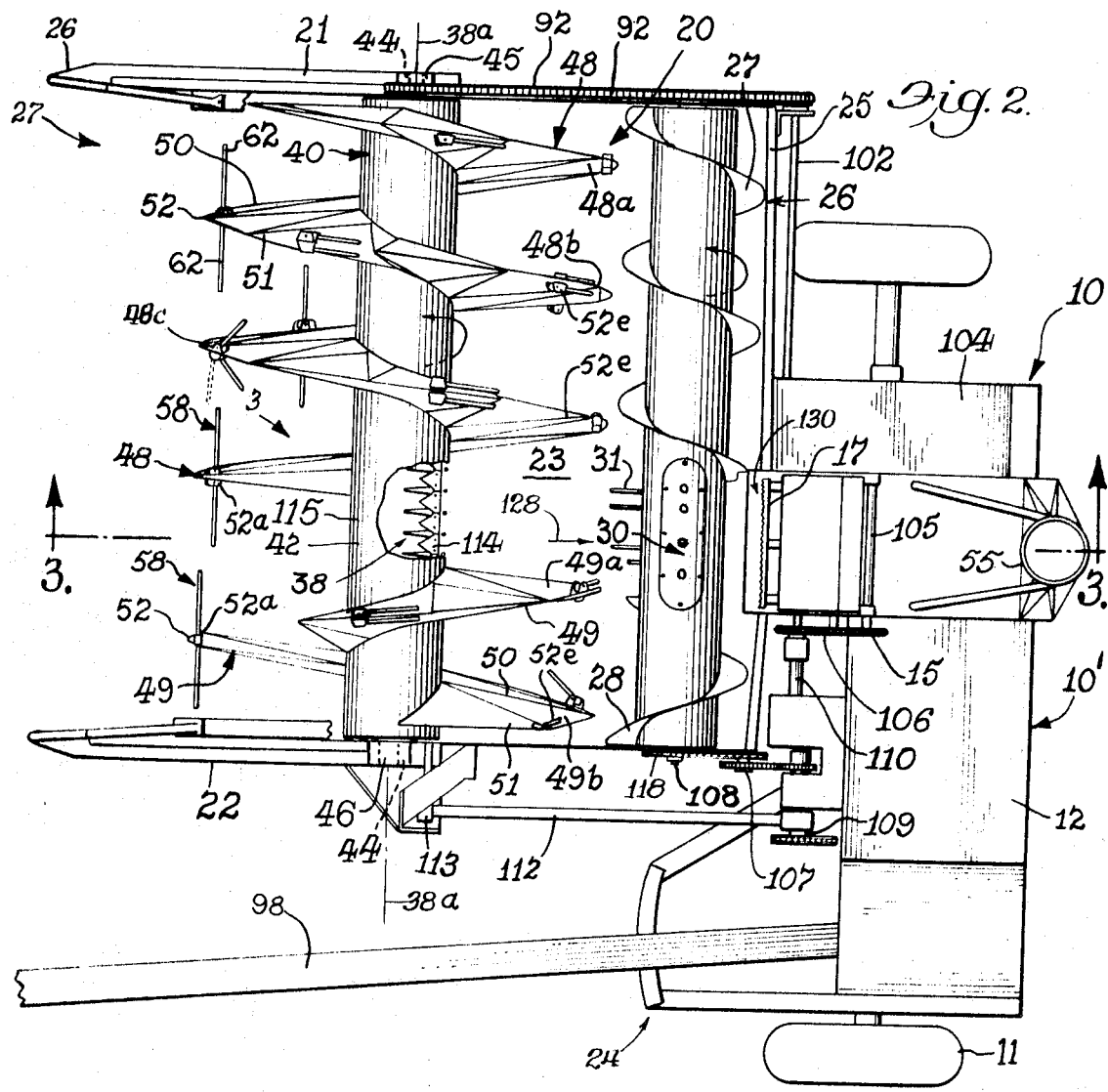
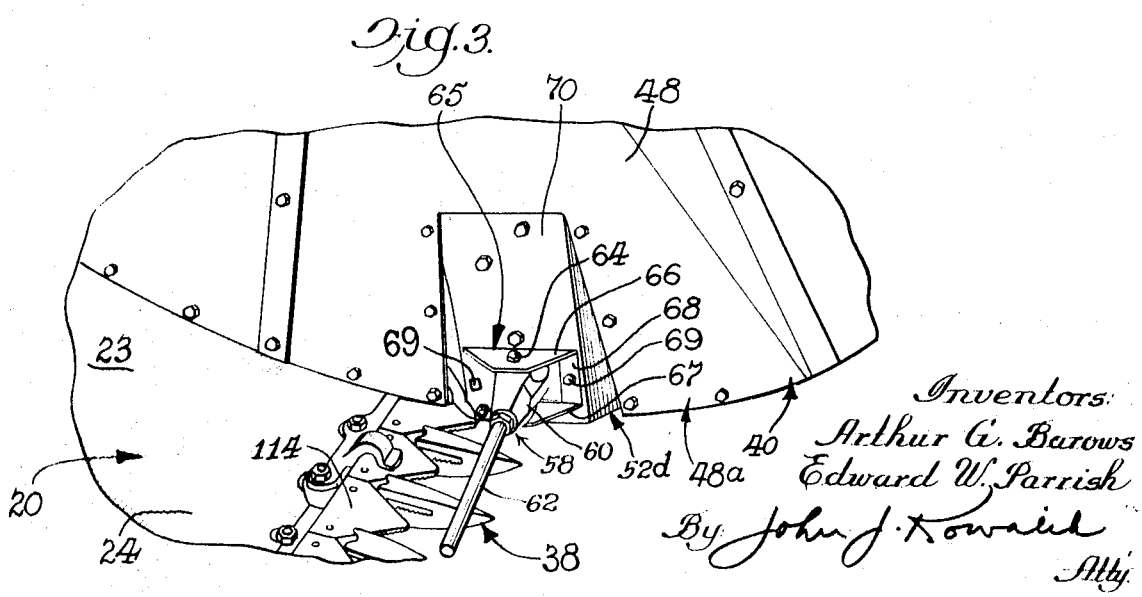

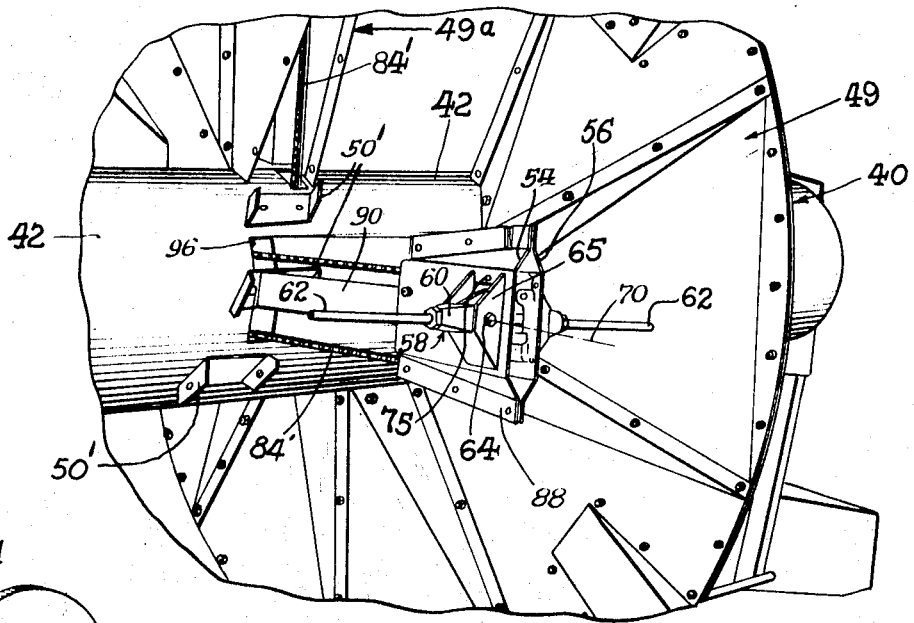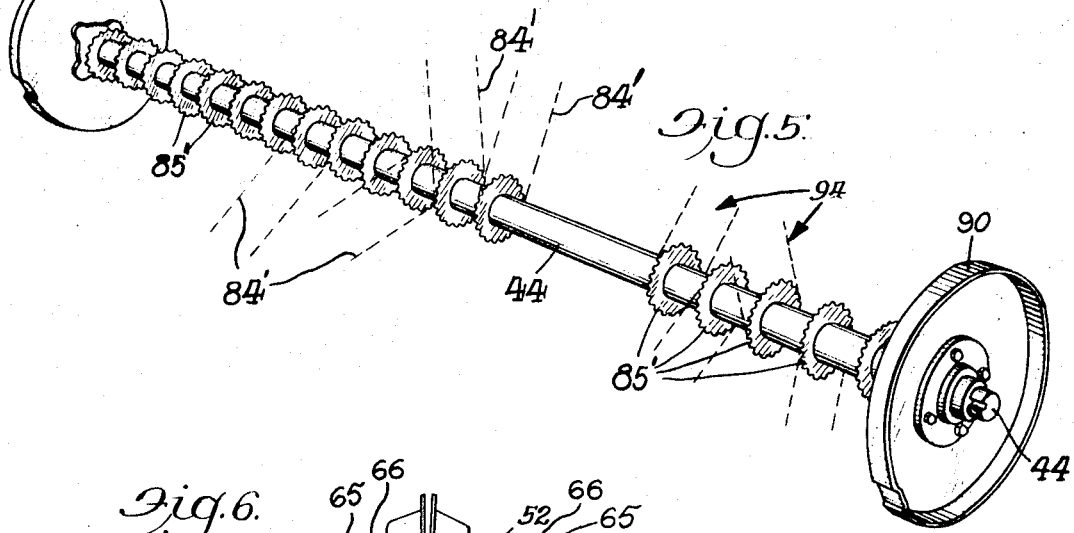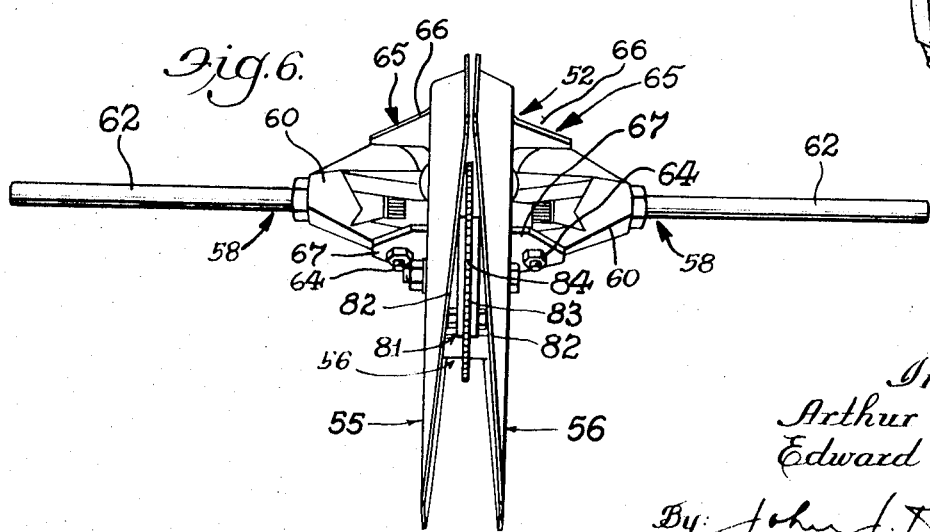

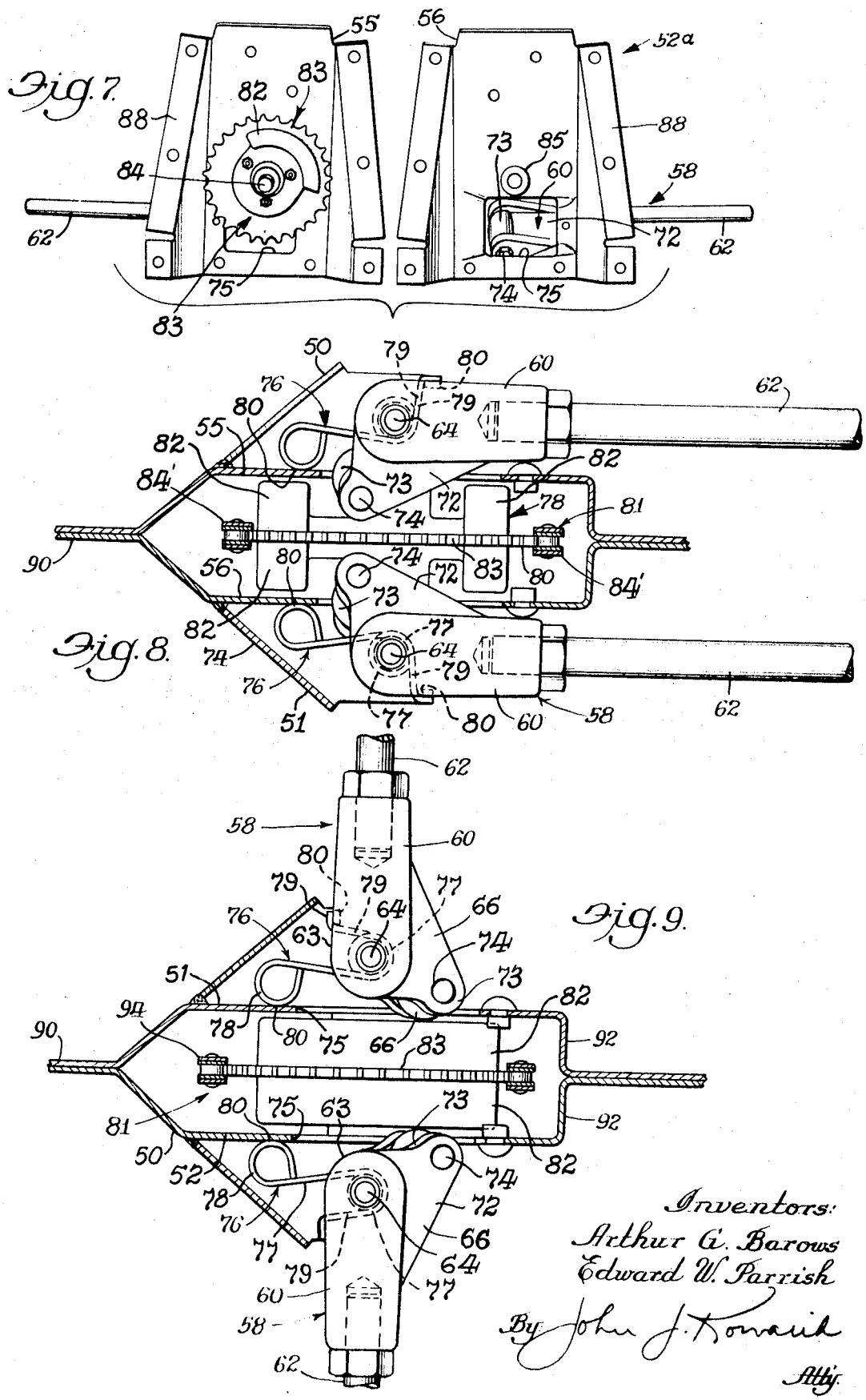

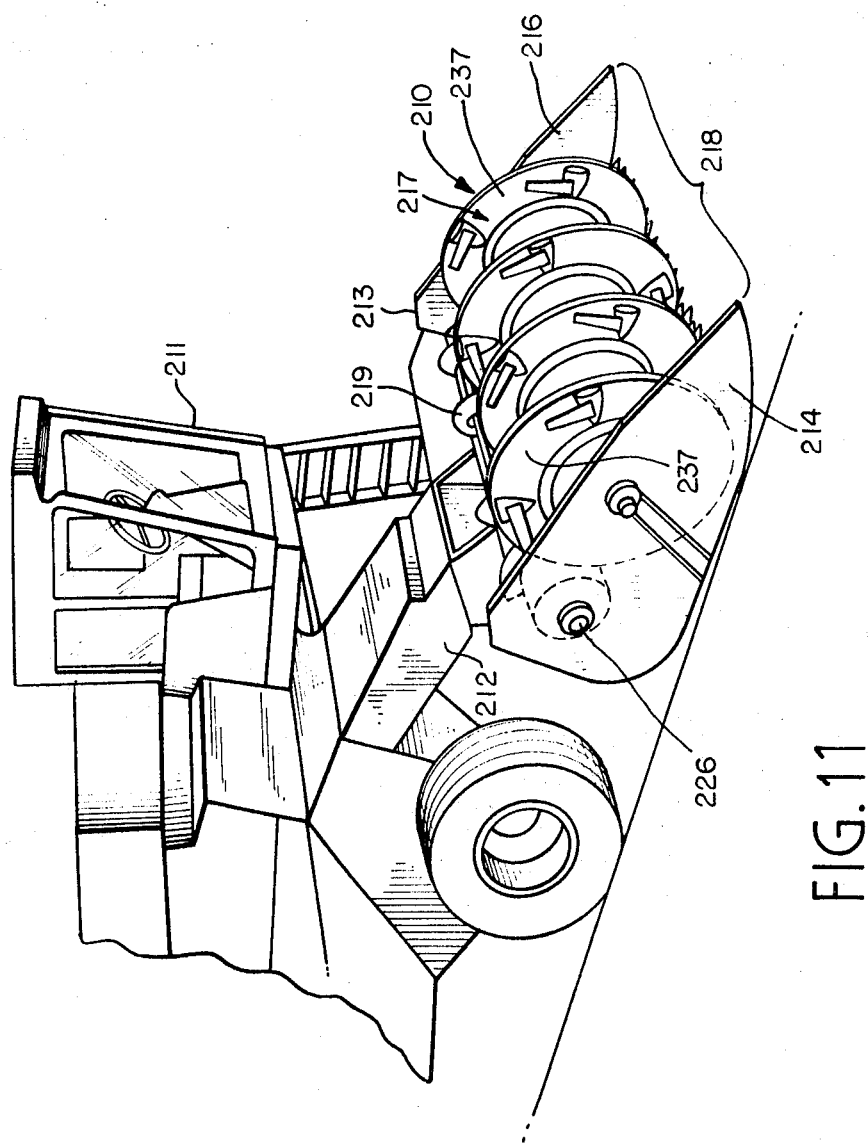

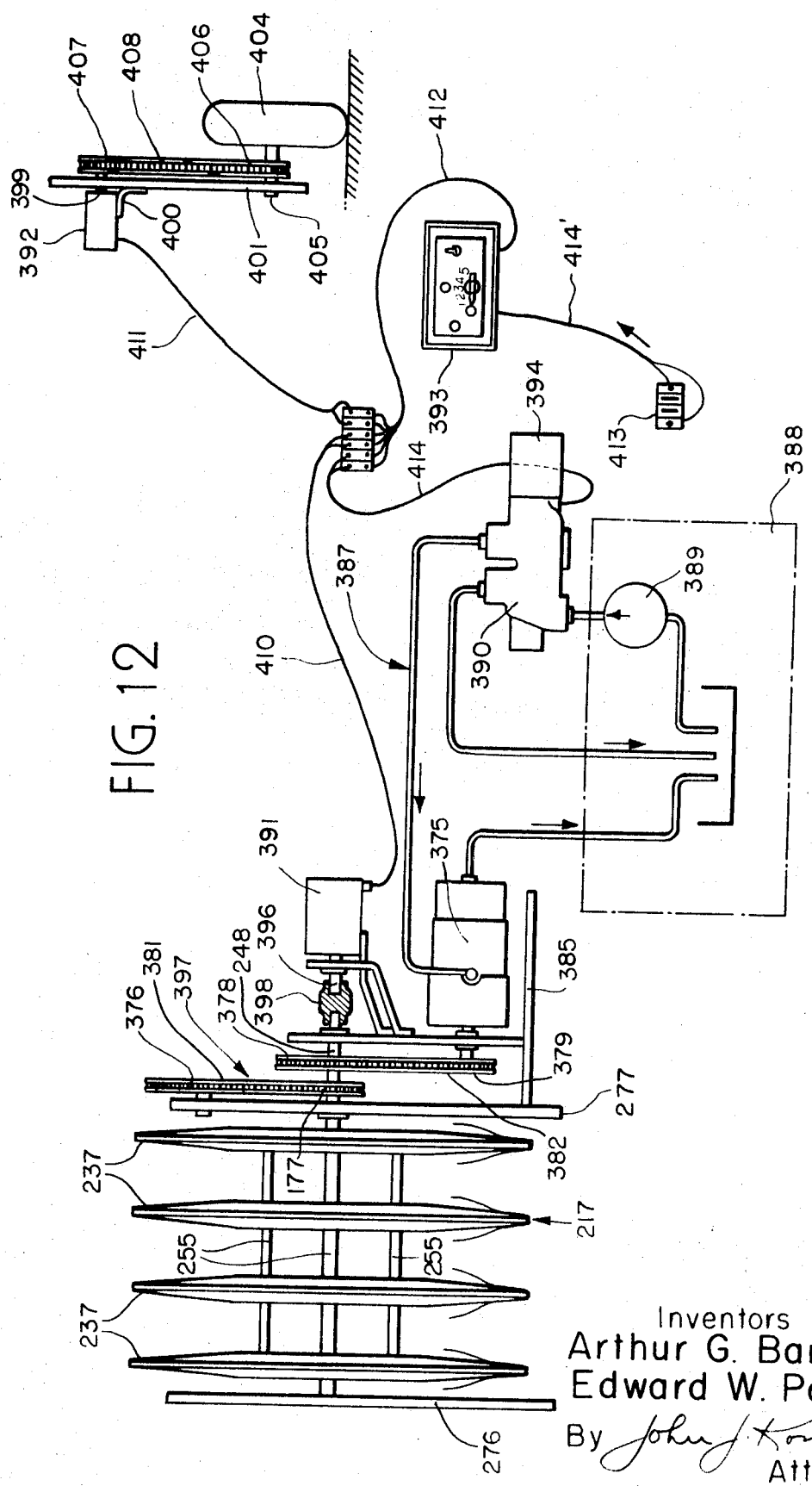

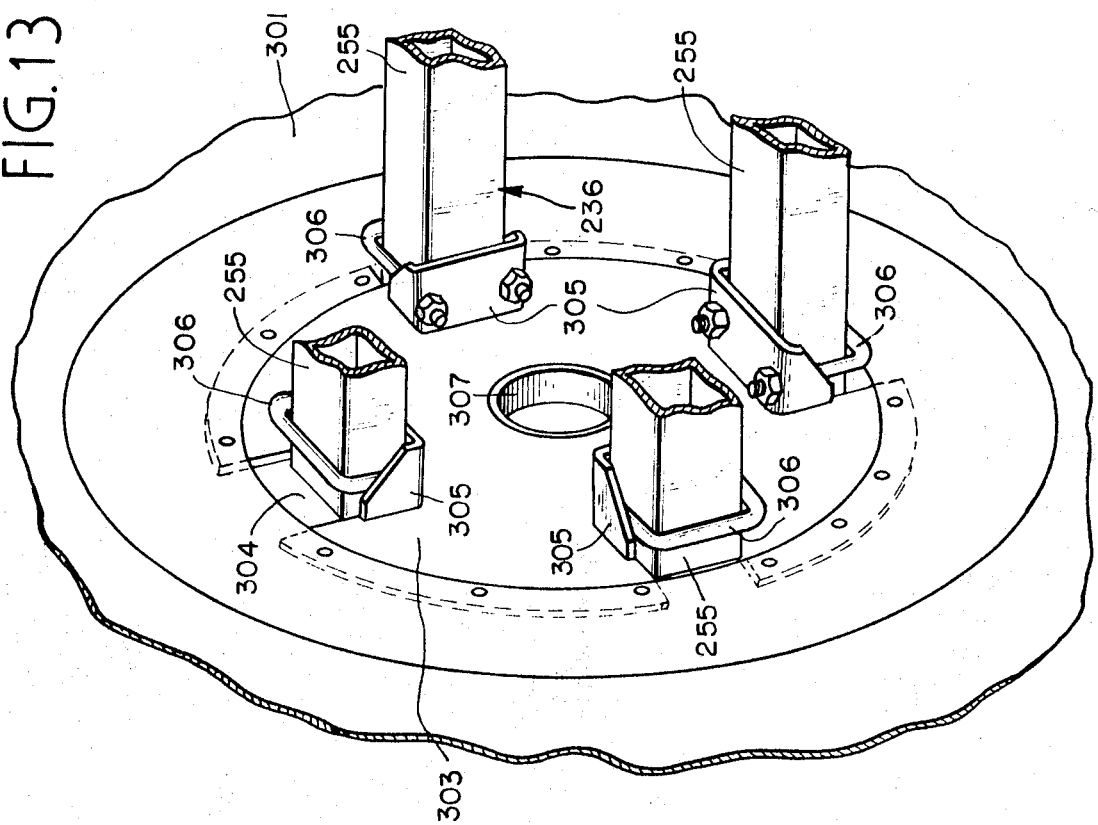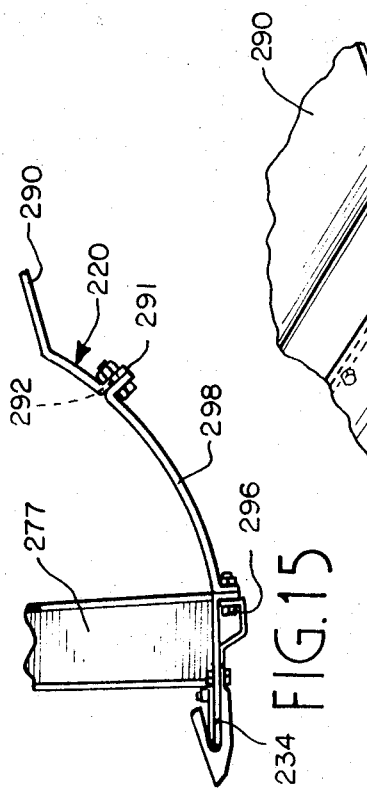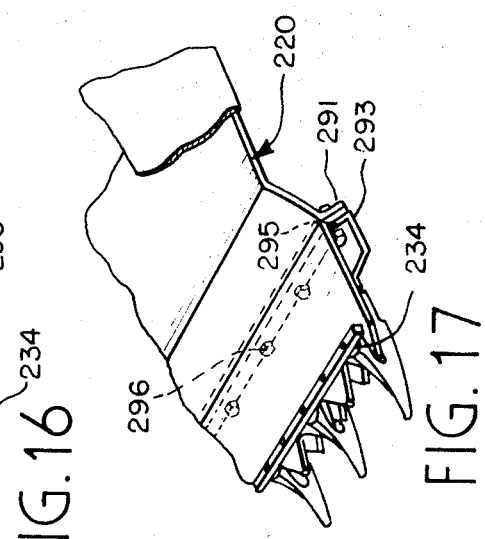

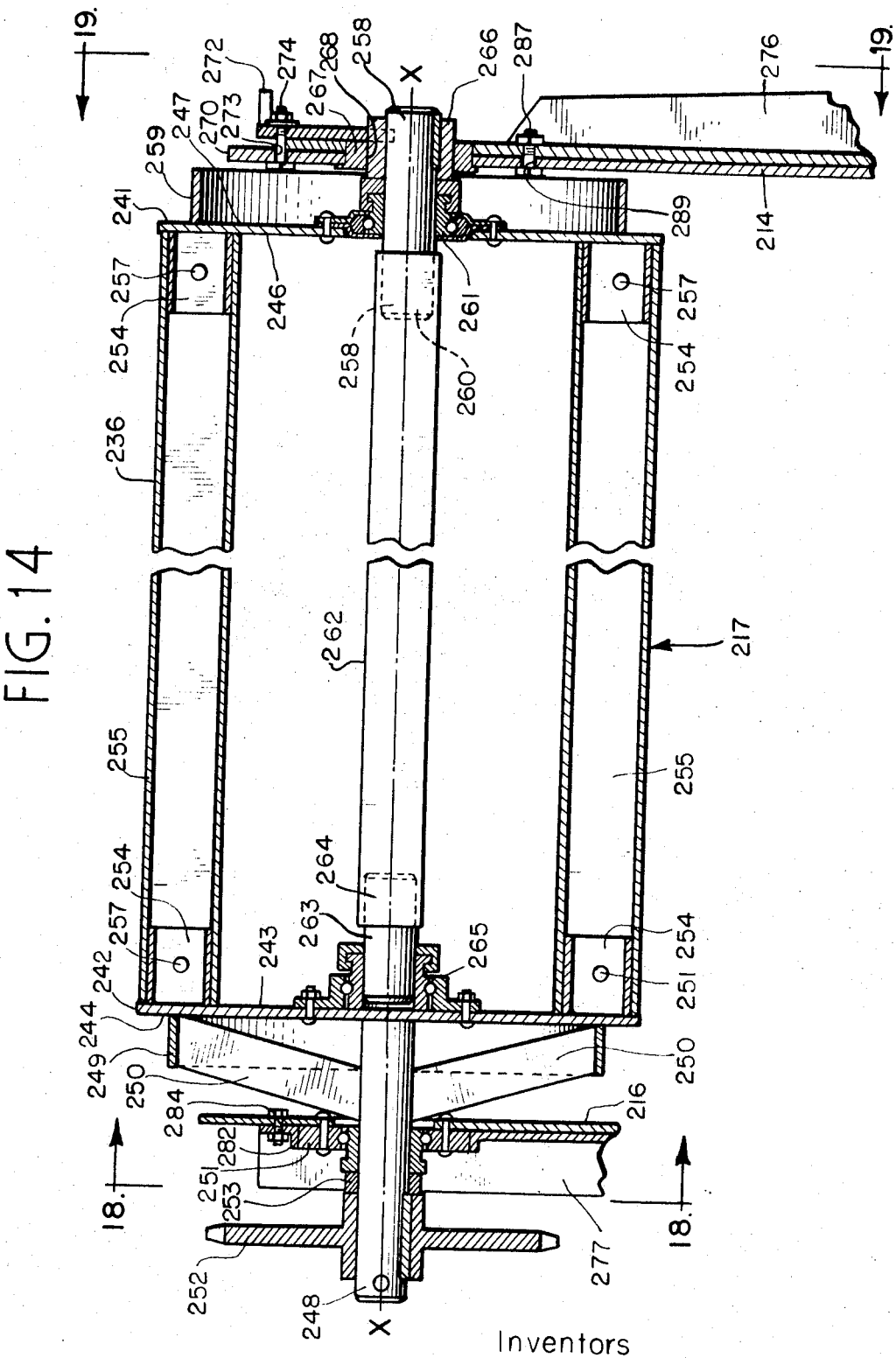

Inventors
Arthur G. Barows
Edward W. Parrish
By John J. Kowacih

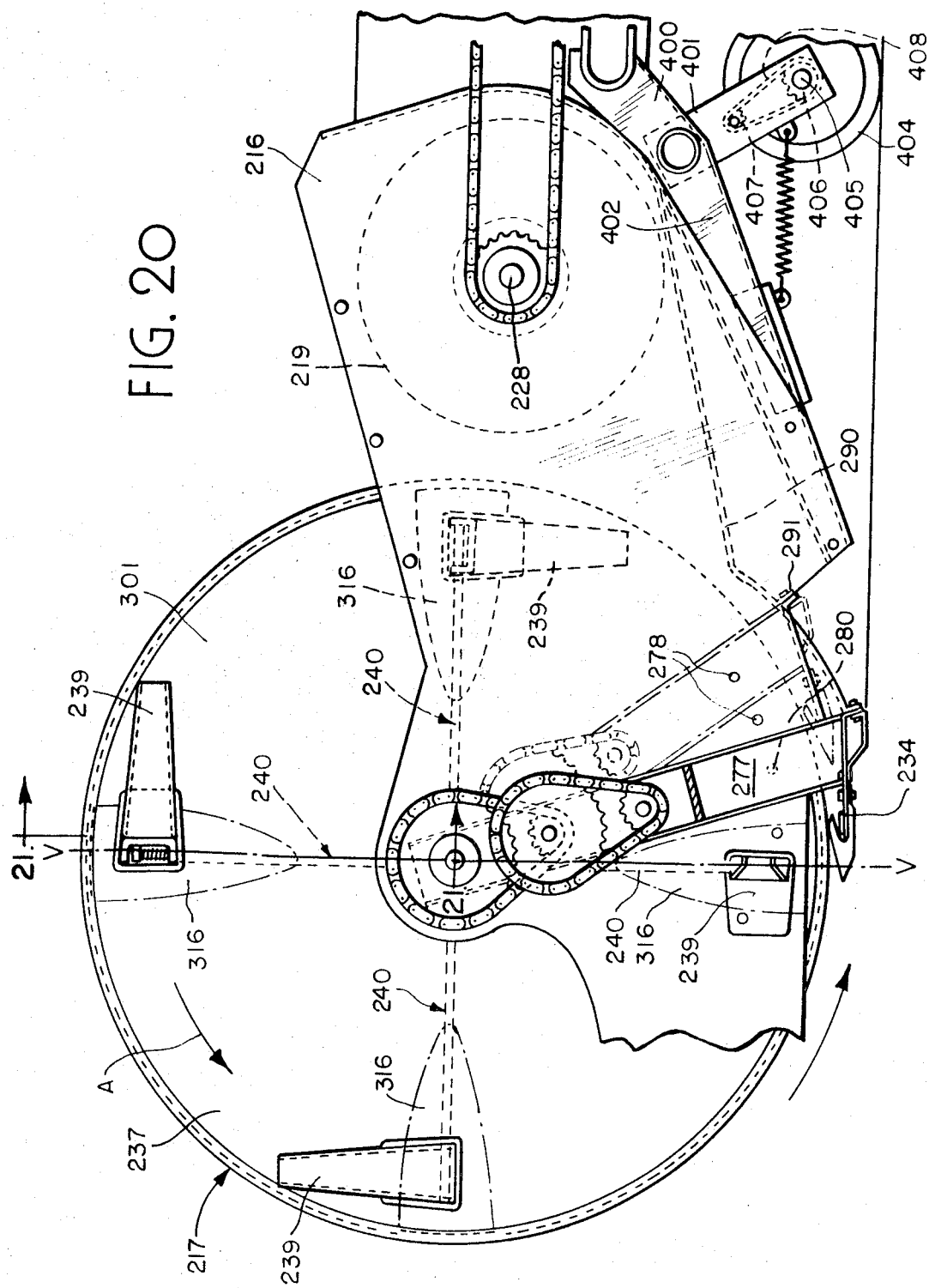

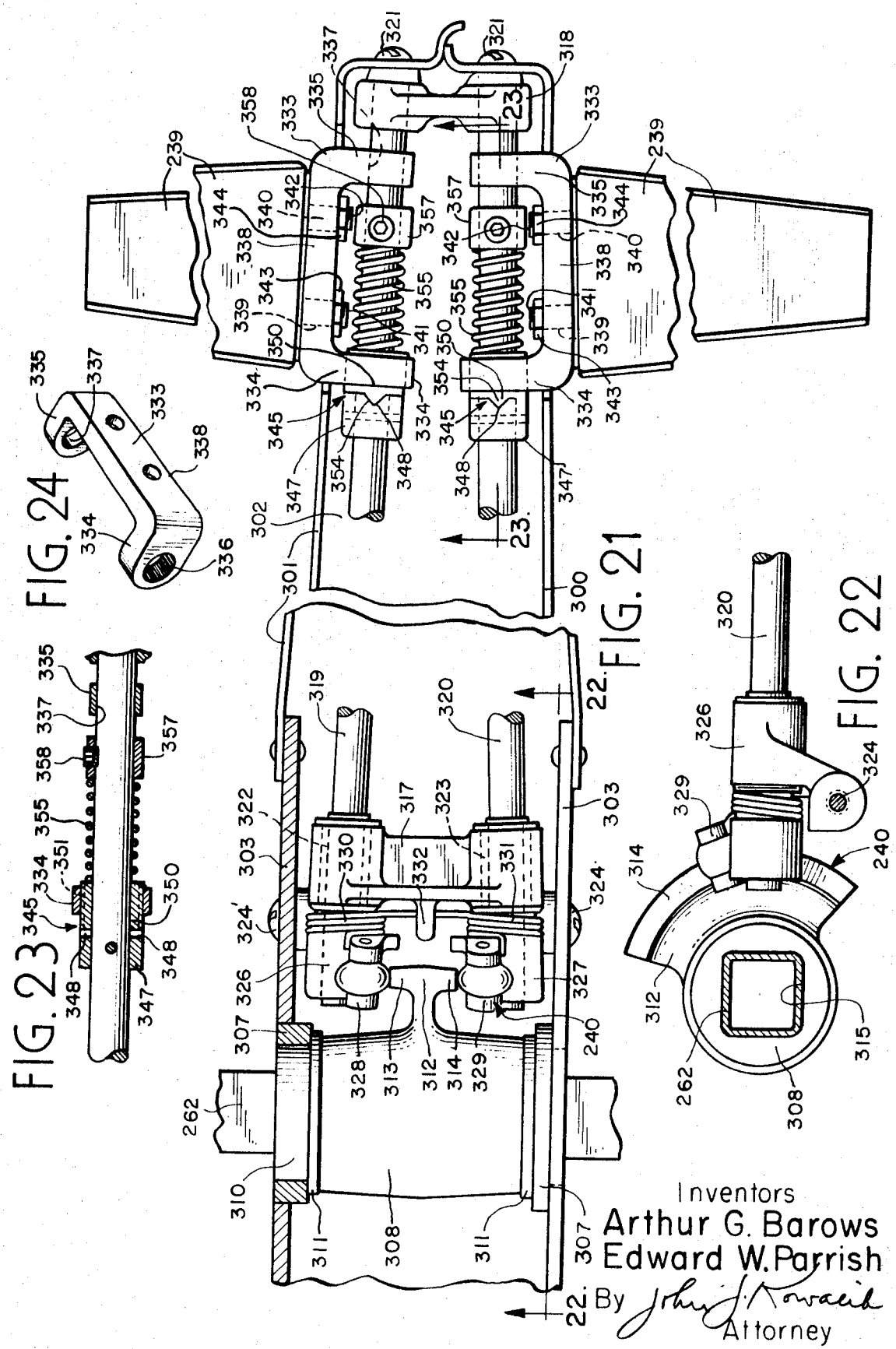

ROWLESS CROP HARVESTER

BACKGROUND OF THE INVENTION

Present agricultural practices pertaining to row crop planting are in part dictated by the versatility and availability of harvesting equipment. At one time, space between the crops was necessary in order to perform mechanical cultivating operations, however since the advent of chemicals and mulch planting and other farming practices an alternative method to weed control it is found that in many cases mechanical weed control is no longer necessary. Agriculturalists have also found that in some crops there is a potential of higher yield per acre of ground when narrow row or rowless planting operations are employed and the crop emergence is controlled to cover and shade the ground to inhibit weed growth.

Most farm equipment manufacturers have recognized this tendency toward narrow crop rows and have presently directed efforts toward manufacturing equipment adaptable to harvesting more narrow row plantings such as 15 inch and 20 inch spacings. Heretofore, the general approach for solving the narrow row problem has been the tendency to develop harvesting equipment which can be utilized for only harvesting crops arranged in a fixed row spacings. It is apparent that as row sPacing between crops diminishes, the physical problem of moving machinery between such rows are self-defeating.

It is our objective to have a multi-functional non-row sensitive harvesting apparatus which would be adaptable to harvesting various crops planted in rows or broadcast.

It is our object to provide harvesting equipment having the advantage of having essentially one basic type harvesting head adaptable for many different types of crops and harvesting operations which can be produced in larger production runs than is now experienced in producing the specialized harvesting equipment.

The invention herein disclosed is directed toward solving these problems and relates to a harvesting apparatus which can be adjusted to operate in any crop row spacings and also in rowless or broadcast planted harvesting situations. The instant invention is provided with elements which are adapted to penetrate the crop and to sweep the crop, as it is severed and gathered onto a harvesting platform. These harvesting elements are so arranged on a support that their motion defines a reoccurring path and pattern of movement relative to the ground and with respect to the standing crops in the field. There is also provided means by which the gathering or harvesting elements can be actuated into harvesting action at any point along the path. The harvesting apparatus also includes means by which the pattern of movement of the harvesting elements can be modified such that direction and magnitude of the relative velocity of the harvesting elements can be selectively chosen to thereby conform to various crops and harvesting situations.

A general object of the invention is to provide a non-row sensitive harvesting apparatus adaptable for harvesting operations and fully effective for harvesting any of various crop plants, whether row crops, or non-row crops, and in the case of row crops is fully effective regardless of the spacing of the row, or other characteristics thereof.

Still another object of the invention is to provide a harvesting apparatus having harvesting elements which can penetrate the crop and be actuated to gather the crop onto a harvesting platform.

An object of the foregoing is to provide that these harvesting elements have a path of movement relative to the ground wherein such a path defines a reoccurring pattern of movement of the elements relative to the standing crops in the field.

A still further object of the invention is to provide that these gathering elements be selectively extendable at any point along the path of movement.

A still further object of the invention is to provide a harvesting apparatus in which the gathering head includes means capable of transversely moving the harvested crop gathered on the harvesting platform to a particular location thereon.

Another and broad object of the invention is to provide a harvester of the foregoing general type which includes a cutter for cutting the crop plants and a gathering head cooperating with the cutter for controlling the movement of crop plants as they are being cut, the gathering head having fingers that are normally in retracted position, but are moved into active or advanced position as they approach the cutter and function in association therewith for sweeping the crop plants off the cutter and onto the platform, the fingers retracting into the gathering head above the platform and wherein one embodiment at least the rear portion of the gathering head functions as an auger for moving the cut crops lengthwise of the transversely elongated platform into a discharge area for transfer to associated processing mechanism.

Another and more specific object is to provide a harvester of the general character just referred to in which the fingers when retracted are in a trailing position so that they readily and easily lead into the standing crop plants, and as they approach the cutter, they are moved into a position transverse to the direction of movement so that they positively and effectively engage the crop plants for controlling them and moving them against the cutter in the cutting operation.

An object of one embodiment of the invention is to provide a combination reel and auger having sweep fingers operative to move the material to the cutter bar therebeneath and sweep the cut material off the bar into an auxiliary conveyor.

An object of another embodiment is to form the reel of a plurality of disks which are adjustable across the width of the platform to required spacing for effective gathering and transfer of the crop material and which will minimize prostating the crops which would be lost to the harvesting mechanism.

Other objects and features of the present invention will more fully become apparent in view of the following detailed description taken in conjunction with the accompanying drawings illustrating an embodiment incorporating the inventive concepts hereinafter disclosed.

BRIEF DESCRIPTION OF THE DRAWINGS

FIG. 1 illustrates one embodiment of the harvesting apparatus partly in section taken substantially on line 3—3 of FIG. 2 and mounted on a mobile carrier;

FIG. 2 is a plan view of the apparatus;

FIG. 3 is a fragmentary perspective view of an enlarged portion of the harvesting head or reel and platform;

FIG. 4 is a perspective view, with portions removed, of one of the flights of the harvesting head showing essential portions of the novel harvesting element operating mechanism;

FIG. 5 is a perspective view of a portion of the drive for the harvesting finger elements;

FIG. 6 is an enlarged front view of one of the pair of harvesting finger elements;

FIG. 7 is an open apart view of the interior of cooperating gathering finger actuating parts;

FIG. 8 is an enlarged sectional view taken substantially along line 8—8 of FIG. 1 showing the fingers folded;

FIG. 9 is a further fragmentary view of the structure of FIG. 8 showing the fingers extended;

FIG. 11 is a perspective view of the embodiment of FIG. 10 shown in association with a self-propelled harvester, such as a combine;

FIG. 12 is a diagrammatic view showing a drive arrangement for the components;

FIG. 13 is an enlarged broken away view of a portion of the novel reel taken substantially on line 13—13 of FIG. 10;

FIG. 14 is an enlarged broken apart sectional view taken substantially on line 14—14 of FIG. 10;

FIG. 15 is an edge view of the platform deck of this embodiment;

FIG. 16 is a fragmentary perspective view of the structure shown in FIG. 15;

FIG. 17 is a fragmentary perspective view of a foreshortened platform deck;

FIG. 20 is a side elevational view of the novel harvesting mechanism with an alternate position shown in phantom lines;

FIG. 21 is an enlarged radial sectional view of one of the reel disks showing the finger operating mechanism taken substantially on line 21—21 of FIG. 20;

FIG. 22 is a sectional view taken substantially on line 22—22 of FIG. 21;

FIG. 23 is a sectional view taken substantially on line 23—23 of FIG. 21; and

FIG. 24 is a perspective view of the finger mounting bracket.

DESCRIPTION OF THE EMBODIMENT OF FIGS. 1-9

Figure 10:
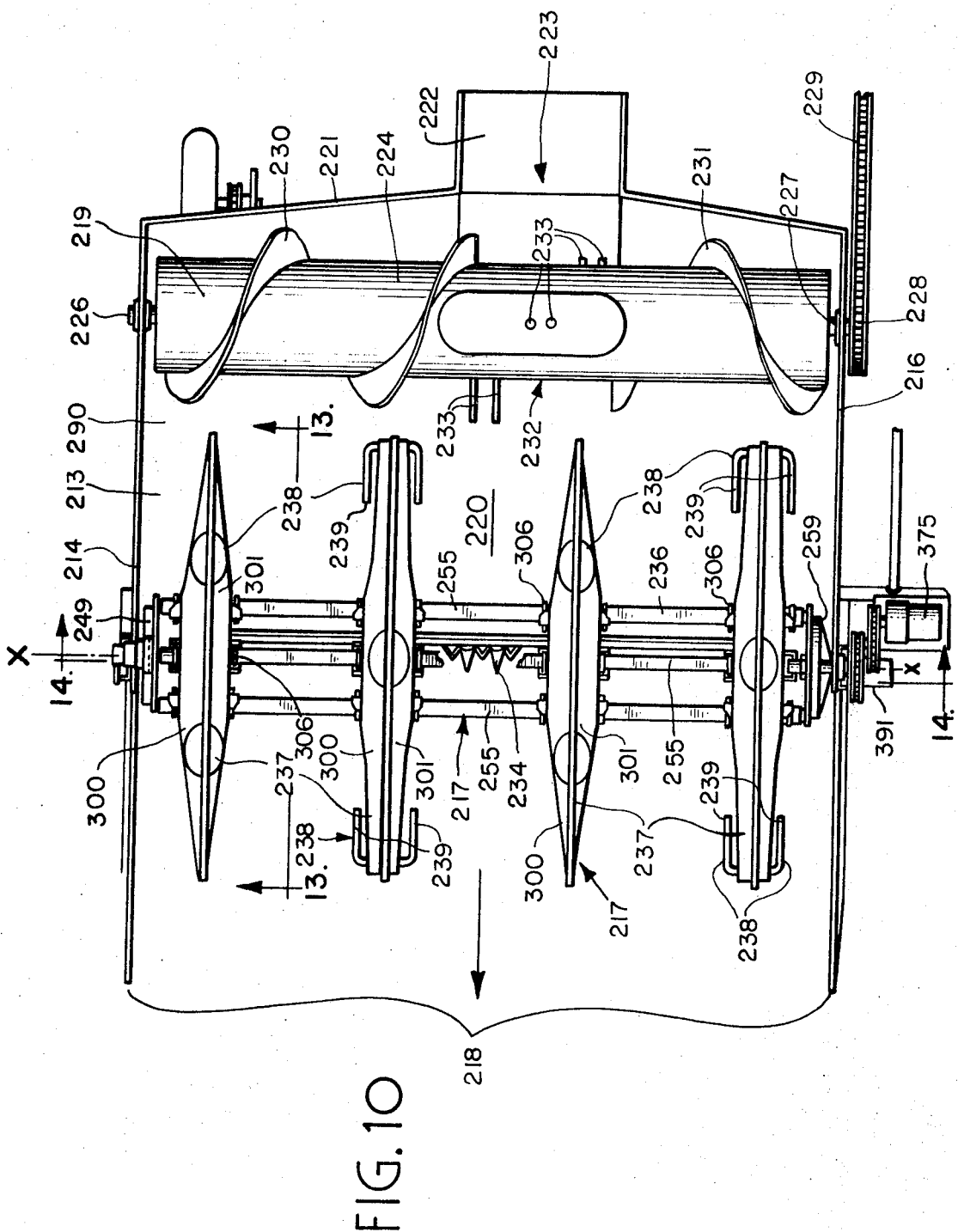
FIG. 10 is an enlarged plan view of another embodiment of the invention.

The invention of FIGS. 1-9 is herein shown in connection with a pull-behind or towing-type forage harvester generally designated 10 although it will be understood that the invention is applicable to self-propelled units of the same type or of the types such as combines, corn harvesters, etc. for harvesting various types of crops. The harvester 10 comprises a basic unit 10' including a wheeled framework 11 which carries a power unit 12 (FIG. 2) suitably connected to driveshaft 13 of a chopper 14 and having various drives as well known to those skilled in the art, and include those which are shown at 15 for driving conveying rollers 16 and the conveying apron 17 as is well known to those skilled in the art.

This is a well known structure utilized in the current line of International Harvester Company forage harvesters.

A harvester platform generally designated 20 is positioned ahead of the basic unit and comprises transverse rear pivots 21 which are pivotally supported within jaws 22 on the framework 11 of the basic unit 10. The platform 20 comprises upright, laterally spaced side walls 21 and 22 and a bottom rear solid wall 23 which comprises an upwardly and rearwardly inclined forward portion 24 and a rear portion 25. An auger conveyor 26 is rotatably supported between the side walls 21 and 22 of the rear portion 25 and has reversely pitched screw threads or flights 27 and 28 which are adapted to move the crop material delivered thereto, pursuant to rotation in the direction of the arrow shown in FIG. 2, toward an intermediate flight-free portion 30 whereat there are provided concentrically disposed fingers 31 operative to sweep the material in the direction shown by the arrow in FIG. 1 into the nip 32 (FIG. 1) developed between the upper and lower conveyor portions 16 and 17 for delivery thereby to the chopper head 14 whereby the material is cut against the shear bar 34 and discharged upwardly and rearwardly through the discharge duct 35 into a trailing wagon as well known to those skilled in the art.

A reciprocating cutter 38 is mounted at the lower forward end of the forward portion 24 of the platform for cutting the crop material fed thereto by the crop gathering and conveying reel mounted thereabove and generally designated 40.

The crop gathering head or reel auger 40 comprises a relatively large center core 42 which extends lengthwise of the platform on an axis 38a—38a forwardly of the cutter bar 38 generally parallel thereto between the side walls 21 and 22 and at opposite ends the reel is provided with suitable shaft ends 44 which are suitably journaled in bearing structures 45 and 46 which are mounted on the end walls 21 and 22. The core 42 is fitted with reverse flight structures generally designated 48 and 49 which are essentially of the same construction except for one being sinistrorsal and the other one being dextrorsal. The flight 48 comprises section 48a, 48b, 48c and flight 49 includes sections 49a and 49b. Each section comprises a pair of side walls 50 and 51. The side walls of each flight section are secured to the core by brackets 50' and converge outwardly into an apex 52, to form the outer periphery of the reel.

At periodic intervals the gathering heads 52a, 52b, 52c and 52d are mounted in the flight sections and each comprises a pair of opposed housing halves 55,56 which encase the operating or gathering fingers generally indicated 58. Each gathering finger comprises an inner end mounting block 60 connected to an outwardly extending finger 62. The block 60 is in the form of a bell crank lever and is pivoted at its elbow 63 on a pin 64 which extends generally radially with respect to the core 42. The block 60 is fitted into a bracket 65 (FIG. 3) between the inner and outer ears 66 and 67 thereof which are connected by a base 68. The bracket base is bolted as at 69 to the external side of the associated housing half 55 or 56. The inner leg 72 of each block 60 is bifurcated and supports a roller 73 on a pin 74. The leg 72 and the roller project through an opening 75 in the side wall 50 or 51 of the associated flight portion. The pairs of finger structures at opposite sides of the flights are biased to a folded position against the respective side walls 50 and 52 by torsion springs 76 each of which has a helical portion 77 which is wrapped about the pin 64 and has a loop-like inner leg portion 78 which rockably abuts as at 80 against a portion of the wall 51 or 52 adjacent to the opening 75 and the torsion spring has another leg 79 which engages behind a shoulder 80 on the back side of associated finger-mounting block 60. In FIG. 8 the normal folded position of the parts is shown with the fingers 62 folded against the opposite sides of the respective flight portion. As best seen in FIGS. 7, 8 and 9, the fingers are actuated to extended position by means of cams 82 formed on opposite sides or attached to opposite sides of a drive element 83 which is in the form of a sprocket. The element 83 is journaled on a shaft 84 FIGS. 1 and 7 which is carried by suitable bearings 85 on the housing halves 55 and 56 which are joined at 88. The driving elements or sprockets 83 are each connected by a chain 84', one of which is diagrammatically shown in FIG. 1, to a respective sprocket 85 mounted on the stationary center shaft 44. The chain extends through a respective aperture 96 in the core. Thus, it will be observed that the core as well as the auger flights connected thereto 48a, 48b, 48c and 49a and 49b are rotatable with respect to shaft 44.

The core is mounted at opposite ends on supports 90 and 91 and is driven by a chain and sprocket drive 92 as best seen in FIG. 2. As the reel rotates, the sprockets 83 rotate about their own individual axes whereby the cams 82 carried thereby are caused to sequentially engage the rollers 73 whereupon the fingers are swung to an extended outward position as shown in FIG. 2 on the forward side of the gathering head and in their extended position they sweep over the mower bar as seen in FIG. 3 carrying the material upwardly and rearwardly on the platform 20 into the auger 26 which condenses the material to the discharge area 30 whereupon the fingers 31 carry the material into the conveying assembly for delivery thereby to the chopper. It will be observed that the position of the area of extension and retraction of the fingers is governed by the position of the cams and these cams, of course, may be modified anyway desired to open and close or extend the fingers and allow the fingers to collapse or fold in different locations with respect to the cutter and the auger 26. The adjustment of the opening or the extension and folding of the fingers is readily controlled by rotating the drive element 83 with the chain removed and then connecting the chain whereby the timing of the extension and folding of the fingers is readily controlled. Thus, it is seen in FIG. 2 as the reel head enters into the crops, the fingers are folded rearwardly and then after the fingers are in the crop, the fingers extend and since the direction and speed at which the unit is pulled by means of the tongue 98 by a suitably tractor, is timed with the speed of orbit of the gathering head there is no motion of translation between the fingers and the crop. The invention, however, does envision and is within the scope of this disclosure to vary the speed at which the reel head rotates so that the crops may be moved faster slightly rearwardly than the forward travel of the machine is moved faster or slower depending on the nature of the crop and this is readily accomplished by changing the drive sprocket assembly 92 to obtain a larger or smaller diameter.

As best seen in FIG. 2, the assembly of drive chain and sprocket assembly 92 is driven from a shaft 102 which is suitably connected to the power train not shown well known to those skilled in the art driven by the mower 12. The prime mower 12 also drives through a suitable chain and sprocket or other train assembly which preferably is enclosed within the housing 104, the shaft assembly 105, the chain and sprocket assembly 106 which, in turn, drives the chain and sprocket drive 107 which is drivingly connected to the shaft 108 of the auger 26. The drive assembly includes a crank-type output 109 shaft 110 which drives a pitman 112 which, in turn, drives a motion transfer mechanism 113 suitably connected to the sickle 114 of the cutter mechanism.

In operation the harvesting unit is advanced through the field into the row or non-row crops 126 in any direction and the crop enters between the flights the fingers which are sequentially extended between the crops. These extended fingers sweep the crops to the cutter and then propel the crops up the platform. Also the flighting is such that the crop is aided by the flights as they pass the rear side of the reel to move laterally while the fingers are collapsed as best seen in FIG. 1. The core 42 is devoid of flighting at 115 which is in fore and aft alignment with the core portion 30 of the rear auger so that whatever crop is carried by the flighting 48 and 49 it will be aggregated in fore and aft alignment with the flightless core portion 30 and with the aid of the extended fingers 62 in this region the material is carried to the fingers 31 and the latter then sweep the material into the conveying mechanism.

DESCRIPTION OF THE EMBODIMENT OF FIGS. 10–24

Referring to FIGS. 10–24 showing a rowless harvesting apparatus 210 mounted on a mobile carrier 211 having a central material conveyor 212 operative for receiving harvested material from the apparatus 210.

The carrier 211 includes a prime mover, power trains and hydraulic systems (not shown) capable of providing power for its own particular functions and that of harvesting apparatus 210. The carrier may take the form of a combine, forage chopper, cotton harvester or any of a number of crop handling and/or treatment systems. It is also noted that the harvesting apparatus 210 may have its own power generating plant, such as an internal combustion engine, rather than using power from the carrier; this would merely be a design choice and does not go to the essential inventive concepts incorporated into the non-row sensitive harvesting apparatus 210 described herein.

The harvesting apparatus 210 comprises a platform designated 213 having spaced apart structural side walls 214 and 216. Harvesting means, generally designated 217, comprising a reel is mounted from and between the side walls (214, 216) to define a transverse harvesting range 218 whereat penetration into field borne crops is effected as the apparatus 210 is advanced through the field. A material receiving auger 219 is also rotatably mounted between the walls 214 and 216 at a location directly behind the harvesting means 217.

As best seen in FIGS. 10 and 14, the platform 213 has a material receiving deck 220 and an upright rear wall 221 extending across the rear of the harvesting apparatus 210 and joining with the side walls (214, 216) thereat. A chute 222 defining a central rear opening 223 is disposed in the rear wall 221. The auger 219 is disposed adjacent the rear wall 221 and has a cylindrical body 224 rotatably carried upon stub shafts 226 and 227 protruding from each end thereof. The shafts 226 and 227 are journaled on the walls 214 and 216 by means suitably bearing assemblies as shown. The shaft 227 extends through the wall 216, and is secured at the end thereof to a sprocket 228 having a chain 229 trained thereabout which may be connected to the power train of the prime mover for transmitting power from the carrier 211 to the auger 219. A pair of oppositely directed auger flights 230 and 231 are secured to the body 224 and are active to convey material across the material platform to a central area 232 substantially aligned with the opening 223 in the rear wall 221. At this central area 232 the flights 230 and 231 are discontinued and crop impellers taking the form of radially protruding rods 233 are circumferentially spaced about the body 224. These rods 233 are extended from and retracted into the auger body 224 such that they are operative to receive crops from the flights 230 and 231 and then thrust the crop through the opening 223 as the auger rotates. This is accomplished in a manner and by means of a mechanism not shown, but being essentially the same in structure and operating characteristics to the auger mechanism disclosed in U.S. Pat. No. 2,529,180.

The harvesting reel 217 is mounted forwardly of the auger 219 and over the crop receiving platform deck 220. In this embodiment, a sickle mower 234 is disposed adjacent the forward edge of the platform to provide a transverse cutting line being in advance thereof and along the harvesting range 218 defined by the harvesting reel 217.

The harvesting reel 17 comprises a central core or mounting structure 236 which is rotatably disposed between the side walls 214 and 216 and includes gathering means comprising a plurality of disc housings 237 mounted on the core 236 in such a manner that the principal vertical plane of each housing 237 passes through axis of rotation X—X of the core 236 and is substantially perpendicular thereto. It can also be seen that in this embodiment the axis X—X is disposed substantially parallel to the transverse extent of the sickle mower 234 and its attendant cutting line. This necessarily positions the disc housings 237 mounted on the core 236 in an orientation being normal with respect to the transverse cutting line and harvesting range 218 of the apparatus 210. Furthermore, the principal planes of the disc housings have an alignment with the direction of travel of the apparatus to effect the housings 237 being carried into, and penetrating the crops during harvesting operations.

Each disc housing 237 has mounted thereon gathering means generally designated 238 comprising harvesting elements 239 disposed at intervals on each side of the disc in spaced apart circumferential relation along the peripheral regions of each housing 237 (best seen in FIGS. 10 and 11). Each of the harvesting elements is detachably mounted on and movable into an extended harvesting disposition and a retracted position by an actuating mechanism 240 which will be fully described hereinafter.

Referring to FIG. 14, the core 236 comprises a pair of spaced apart circular end plates 241 and 242 having inner and outer faces 243, 244 and 246, 247 respectively. A drive shaft 248 is centrally affixed to the end plate 242 and extends outwardly from its outer face 243. A ring 249 affixed to the plate 242 to provide identity thereto is concentrically disposed about the shaft 248 and secured to the outer face 243 of the end plate by means, such as welding. Braces 250 are secured to the ring 249 and the shaft 248 in the manner shown to provide torque loading and deflection support at that driven end of core. The shaft 248 is journaled in a pillow block 251 which, in turn, is secured to the structural side wall 214 by rivets as shown. A sprocket 252 is keyed and secured on the end of the drive shaft 248 in a manner well known to those skilled in the art and is spaced from the block 251 by an annular spacer 253. Each of the end plates 241 and 242 have disposed on their respective inner faces 246 and 243 and secured thereto four rectangularly shaped mounting members 254 equally spaced about in circumferential relation as shown typically in FIG. 13. Four support bars 255 having a hollow end construction are fitted over the mounting blocks 254 as suggested in FIG. 14 in a close fitting relation and secured thereto by bolt assemblies 256 which pass through appropriately registering holes 257 disposed at the ends of each of the support bars 255 and their respective mounting block 254. It can be seen in FIG. 13 that this construction provides the core 236 with a span on which the disc housing can be mounted and secured.

The other end plate 241 of the core 236 is supported by a support shaft 258 which is movably secured to the side wall 214. A stiffening ring 259 is welded to the outer face 247 of the end plate 241 in concentric disposition relative to the support shaft 258. The shaft 258, having a square shaped end portion 260, passes through the center of the end plate 241 and is rotatably supported thereat by bearing assembly 261 secured to the plate 241 by rivets as shown. The shaft 248 is positioned so that its squared end portion 258 extends beyond the inner face 246 of the plate 241. This squared end portion 258 receives one end of a hollow square cam shaft 262. The cam shaft 262 extends proximately to the inner face 243 of the end plate 242 whereat the outer end thereof receives a shaft 263 having a squared shaft portion 264. The shaft 263 is rotatably mounted in a pillow block 265 which is centrally disposed and secured to the inner face 243 of the end plate 242 by bolt assemblies as shown. The cam shaft 262 has a square cross section n is centrally disposed among and substantially parallel to the supporting bars 255.

The support shaft 258 extends outwardly from the outer face of the end plate 241 and has keyed and secured thereto a hub 266. The side wall 214 has an opening which receives a sleeve bearing 267 which, in turn, has an inner bore 268 in which the hub 266 snugly fits.

A cam shaft positioning means 269 for releasably locking the cam shaft in a plurality of angular positions relative to the axis X—X and the cutting line of the mower 234, these means are disposed about the outer end of the support shaft 258. The positioning means 269 comprises a locking sector 270 having its converging portion welded to the outer end of the hub 266 (see FIGS. 19 and 19). The sector 270 has an arcuate slot 271 therethrough disposed radially outward from the hub 266. The slot 271 has radii referenced from the axis X—X. A handle 272 is secured to one end of the sector 270 to facilitate movement of the sector to rotate the hub 266 and cam shaft 262. The side wall 214 has a hole 273 centrally disposed in alignment with the slot 270; and a bolt and washer assembly 274 is placed through the hole 273 and slot 270 for locking the sector 270 (and thus the cam shaft 262) is an elected angular position within the limits of the slot 270.

Figure 19:
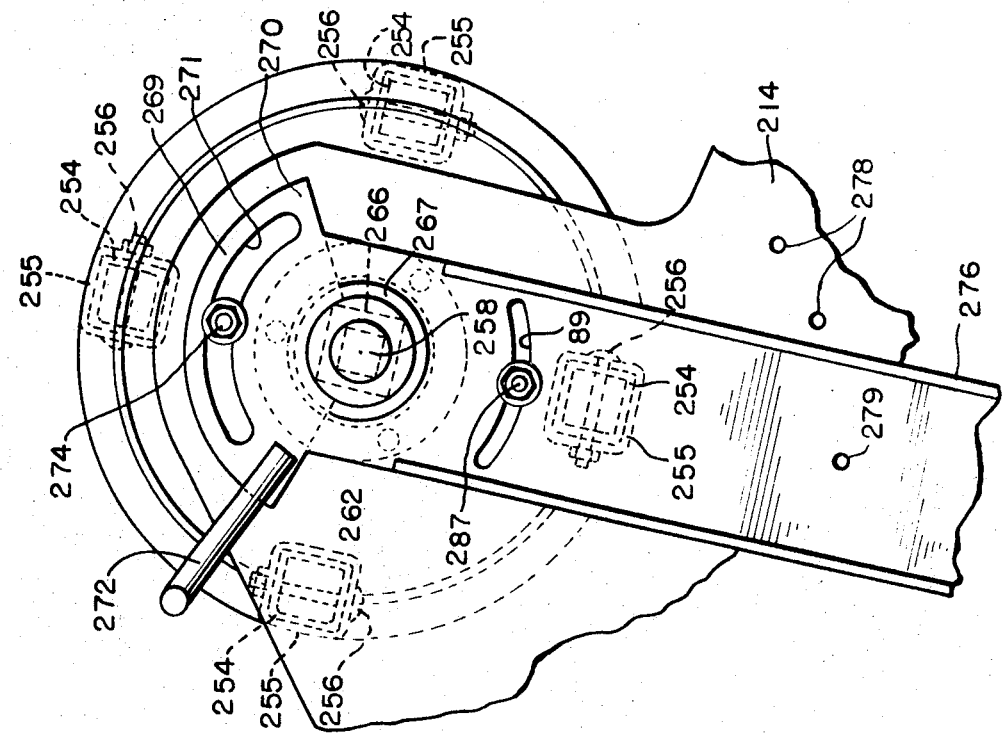
FIG. 19 is an opposite end view of the reel taken substantially on line 19—19 of FIG. 14.
Figure 18:
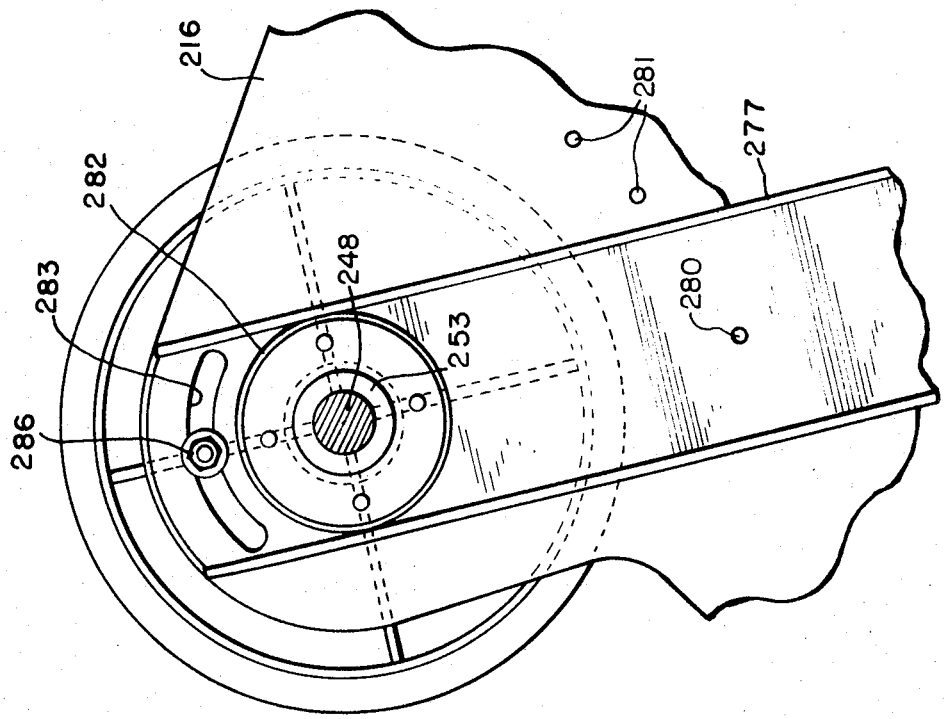
FIG. 18 is a fragmentary elevational view of one end of the reel and support therefore in one position taken substantially on the line 18—18 of FIG. 14.

As seen in FIGS. 18–20, the sickle mower 234 and the forward portion of the crop receiving platform 220 are supported by a right and left hand support channels 266 and 267 respectively which are bolted to their respective side walls (214, 216) at a plurality of positions. This is accomplished by providing the side walls with a series of holes 278 and 281 through the side walls with a series of holes 278 and 281 through the side walls 214 and 216 respectively, whereat the holes (278, 281) are arranged in an arcuate pattern referenced to axis X—X as seen in FIG. 14. Each of the right and left hand channels (276, 277) have spaced apart holes 279 and 280 respectively which register with their respective holes (278, 281) in the side walls at various positions whereat the cutting line of the sickle mower 234 can be selectively positioned forwardly and rearwardly of the axis of rotation X—X of the gathering means 217. When a selected position is elected suitable bolt assemblies are placed through the aligning holes in the side walls and the respective channels such that the lower portions of the channels 276, 277 are securely fastened to their side walls 214, 216 at the elected position. It should be noted that as the channels 276, 277 are repositioned, they move in an arcuate path having a radius referenced from the axis X—X. This is an important feature in that it assures that at each position, the receiving platform can maintain a substantially same radial spacing from the peripheral path of the disc housings 237. The right wall 214 and the right-hand channel 276 also have a similar arrangement of registering holes 281 and bolt assemblies for securing the lower portion of that channel to the wall 214 in a plurality of positions to correspond with those possible aforesaid positions of the left-hand channel 277.

As best seen in FIG. 18, the upper part of the left hand channel 277 has a circular flange 282 defining an opening which closely fits about the pillow block 251 as shown in FIG. 14. The channel 277 has an arcuate slot 283 disposed about the flange 282. The slot 283 registers along its length with a hole 284 in the wall 216. A bolt and washer assembly 286 is positioned through both the hole 284 and slot 283 and serves to secure the upper portion of the channel 277 to the wall 126 in the various hereinbefore mentioned positions at which the mower may be selectively located.

As seen in FIG. 19 the upper end of the right-hand channel 276 is arcuate in form and terminates proximate the lower extremities of the slot 271 of the locking sector 270. The upper portion of the channel 276 is secured to side wall 214 at a location below the support shaft 258 by a bolt and washer assembly 287 disposed through a hole 288 in the side wall and an aligned arcuate slot 289 in the channel 276. The radius of the slot 289 is also referenced from the axis X—X. It can be appreciated that as the sickle mower 234 is repositioned, the slot 289 will allow for pivotal movement of the channel 276 about the axis X—X to a desired location as defined by the holes 281 in the lower portion of the side wall 214.

The crop receiving platform 220 comprises a rear platform section 290 having a continuous lateral extent disposed between the side walls 214 and 216 and has a forward flange 291 having a series of holes 292 spaced apart along that lateral extent. The sickle mower 234 has a rearwardly disposed frame portion 293 having a rear wall 294 with a number of spaced apart holes 295 disposed to align with those holes 292 in the forward flange 291 of the rear section 290 whereby they are secured together by bolt and nut assembly indicated at 296. This arrangement (as shown in FIG. 11a) positions the cutting line of the sickle mower rearwardly of a hypothetical vertical line V—V through the axis X—X. Additional platform sections 297 and 298 are provied to effect optional positioning of the cutting line at positions substantially aligned with and in advance of the vertical line V—V, as suggested in FIG. 20. Each of the sections 297 and 298 have fore and aft flanges which have holes therethrough disposed to registered with those holes 292 and 295 in the forward flange 291 of the rear platform section 290 and the rear wall 294 of the sickle mower 234. Here again, the bolt assemblies are used to secure the additional section into place as shown. It can be appreciated that any number platform sections of varying fore and aft dimensions could be provided to position the cutting line of the mower 234 in plurality of positions forwardly and rearwardly of the vertical line V—V.

Each of the disc housings 237 of the gathering means comprises mating annular walls 300 and 201 joined at their converging peripheral ends to define a space 302 therebetween. Each of the walls 301, 302 have a centrally disposed opening dimensionally larger than that of the outermost spacing of the mounting bars 255. Circular mounting plates 303 are secured to each of the walls (301, 302) by means of rivets as shown in FIG. 13. Each of the mounting plates 303 has four rectangular notches 304 extending radially inward from the edge thereof and spaced apart to register with the spacings of the mounting bars 255. Four channel flanges 305 are welded to each plate 303 in such a manner wherein they extend outwardly from the disc housing and border the inward portion of their respective notches 304 on the mounting plate 303. Each flange 305 has a pair of spaced apart holes for receivng therethrough the threaded legs of U-bolt assemblies 306 which are then used to firmly clamp each flange 305 to its respective mounting bar 255 as indicated in FIG. 13. In this way, each disc housing 237 can be moved laterally along the bars 255 and secured in any desired position. Each mounting plate 303 has a center opening into which a sleeve bearing 307 is pressed. A cam 308 is disposed within the space 302 in each of the mounting plates 303. The cam 308 has an outboard bearing surface 310 an annular flange 311 adjacent each end thereof. A centrally located rib 312 protrudes from a portion of the cam's body to provide a pair of laterally facing camming surfaces 313 and 314. The cam 308 has a rectangular bore 315 which slidably fits over the cam shaft 262. It can be appreciated that the cam 308 will be held from rotation by the stationary cam shaft 262 and the disc housing 237 will be rotatably supported on the bearing surfaces 310 of the cam 308 wherein the entire disc housing 237 and anything connected thereto will orbit about the cam 308 as the housing 237 is rotatably driven by the central core 236.

Each of the walls 300 and 301 of the disc housing 237 has four equally spaced pod-like expansions 316 disposed at the peripheral portion of the housing 237 to provide space therein for the actuating mechanism 240 of the harvesting elements 239 disposed thereat.

Mounted within each disc housing 237 at the location of each of the expansions 316 is the actuating mechanism 240. It is apparent then that in the embodiment illustrated, each disc housing will contain four substantially identical actuating mechanisms. Each actuating mechanism comprises a cam having a hub 308 with a flange 312 on opposite sides of which are mounted cam sectors 313 and 314. The hub portion 309 has a square hole therethrough which complimentally fits upon the stationary square reaction tube 262.

Radially outwardly of the cam there is mounted a journal or support 317 which receives the inner ends of actuating rods 319 and 312 which are pivoted in journals 322 and 323 at opposite ends of the support the journals 322 and 323 being provided with mounting bosses into which bolts 324' and 324 are threaded securing the block 317 to the side walls 303, 303 of the disk structure. Cam followers 326, 327 of rods 319 and 320, respectively and torsion springs, etc. 330 and 331 are provided to bias the cam followers 326 and 327 inwardly toward the cam surfaces 313 and 314. One leg of each spring (330, 331) is disposed to engage a common lug 332 protruding from the inner supporting block 117 and the other ends of the spring 330, 331 are arranged to engage crank arms 328 and 329 of the followers 326, 327 and exert a force thereon whereby each of the cam followers 326, 327 are biased to effect a counterrotation of the rods 319, 320.

The actuating mechanism 240 also includes a pair of identical finger mounting brackets 333, 333' mounted respectively on the outward portions of rods 319 and 320 as shown. Each bracket has arms 334 and 335 spaced axially of the rod. A splined bore 336 is provided in arm 334 and a smooth bore 137 in arm 335. Between the arms 334 and 335 in the bight 338 of the bracket holes 339 and 340 are provided which may receive bolt studs 341, 342 of the harvesting finger elements 239. Nuts 343, 344 are threaded on the studs and bear against the inner side of the bight portion thereby providing that the elements can be easily detached for replacement or substitution.

To prevent the fingers from breaking, a release clutch, generally designated 345, operatively connects each rod (319, 320) to the respective element bracket 333, 333' mounted thereon. The clutch comprises a collar 347 having notches 348 circumferentially disposed at one end thereof and spaced at about 180° intervals thereabout. A splined collar 350 is slidably mounted on each rod (319 or 320) and has a splined connection at 351 in bore 336 of the respective bracket 333 or 333'. The splined collar 350 has a pair of diametrically spaced projections 354 which mate with the notches 348 as shown. A compression spring 355 is mounted on each rod 319 and 320 and provides a force to bias the associated bracket and thus clutch rosette 350 against the fixed clutch collar or jaw 347. The spring reacts against a reactive collar 357 fastened to the respective rod (319, 320) by a set screw 358. In the event of an obstruction, the fingers stop and the clutch releases. It can be appreciated that as the disc housing is driven by the core 336 to orbit about its particular cam 262. As this occurs the cam followers 328 and 329 engage the rib 312 at camming surface 313 and 314 respectively. This causes each of the rods 319 and 320 to rotate and move their respective brackets 333, 333' from a retracted position substantially parallel with the principal plane of the disc housing 237 to an extended position substantially normal to that plane. If however, one of the elements strikes an immovable obstruction while extended, the splined collar 350 will be able to move axially of the respective rod (319, 320) against the force of the spring 355 thereby allowing the element 37 to swing back to the retracted position to prevent damage to itself and the actuating mechanism 40.

A hydraulic motor 375 is utilized to drive the sprocket 376 through a drive train comprising sprockets 377 and 378 connected together and commonly journaled on the left hand channel 277 and sprocket 379 connected to the output shaft of the motor. A chain 380 trained about sprockets 379 and 378, and another chain 381 is trained about sprockets 376 and 377 provides a driving connection from the motor 375 to the drive shaft 248 of the central core 236 as seen in FIG. 12. The motor 375 is also mounted on the channel 77 by means of bracket 385 thereby positioning the entire drive train to move in reference to the axis X—X to provide that the sickle mower 234 can be repositioned through the movement of the channels 276 and 277 (hereinbefore described) without disrupting the drive train. The motor 375 is driven to rotate the core 236 and the disc housings 37 mounted thereon in the direction indicated by the arrow designated A in FIG. 3. The rotational speed of the disc housings 37 is controlled and closely monitored by a control system which will not be described. A pressurized hydraulic fluid system, indicated generally at 387, (FIG. 12) comprises essentially a reservoir 388 and a pump 389. The pump 389 supplies fluid pressure to a flow divider valve 390 of the control system which, in turn, is connected to the motor 375 and reservoir 388 as shown in FIG. 12. The control system also includes reel speed sensor 391, ground speed sensor 392 a control circuit housed in a control box 393 and electrically operated servo mechanism 394 mounted on the flow divider valve 390 and being operative to control the operating characteristic thereof. The reel speed sensor 391 is mounted to the channel 277 from a bracket 395. This sensor 391 has a rotatable input shaft 396 connected to the motor 375 and core-drive train 397 by coupling 398 whereby the rotation speed of the input shaft 396 of the sensor 391 will be proportional to the rotation speed of the reel elements 237. The sensor 391 will generate an electrical output signal representative of the rotational speed of its input shaft 396.

The ground speed sensor 392 is similar to the sensor 391 and also has an input shaft 399 and will generate an electrical signal representative of the rotation speed of that shaft 396. The ground speed sensor 392 is mounted by bracket 400 on an arm 401 pivotally connected at one end to one of a plurality of frame members 402 providing support for the harvesting apparatus platform 213. A ground engaging wheel 404 is mounted on a stub shaft 405 which, in turn, is journaled at the other end of the arm 401 (FIGS. 12 and 20). A sprocket 406 is secured to the shaft 405 and drives the sprocket 407 on the input shaft 399 by chain 408 entrained thereabout at a speed being substantially proportional to the ground speed of the harvesting apparatus 210.

The electrical output signals of both the ground and reel speed sensor 391 and 392 are coupled to the control circuit in the control box 393 by electrical cables 410 and 411 respectively. The control circuit 393 has an output which is also coupled to the servo mechanism 394 by cable 414. A suitable electrical source for the control system, indicated at 413, is coupled to the control circuit by a suitable cable 414. The control circuit 412 is operative to simultaneously analyze the inputs thereto from both of the ground speed and reel speed sensors 391 and 392 and produce an electrical signal at its output which represents deviations from a preselected ratio of these input signals. The output from the control circuit 393 then actuates the servo mechanism 394 which controls the valve 390 such that the hydraulic motor 375 responsively varies the rotational speed of the central core 236 to maintain the peripheral speed of the reel 237 at a preselected ratio with respect to the ground speed of the harvesting apparatus as it advances along the ground and through the crops. The control circuit 393 also includes means whereby a plurality of the aforesaid ratios can be selected. For the purpose of disclosure only, it being understood that the present invention is not limited thereto, the components of the control system may be of the type as follows:

Servo mechanism 394
Speed control sensors 391 and 392
Control box (with control circuit 393).

What is claimed is:

1. A harvester comprising a transverse cutter, rotatable gathering means positioned generally above the cutter, said gathering means being in the form of a combination reel and auger including a central core and flighting thereon, and being operative for moving the cut crop plants laterally and rearwardly, fingers mounted on said flighting, the fingers being movable downwardly at the front and rearwardly at the bottom of the gathering means, and at the bottom moving rearwardly across the cutter, the fingers being movable into active position in which they are transversely disposed and into retracted position, and means operative in response to rotation of the gathering means for moving the fingers into active position only during a portion of the rotation of the gathering means including that portion in which they move across the cutter.

2. A forage harvester according to claim 1 wherein the gathering means includes a core of relatively small diameter and flighting of relatively great diameter extending a substantial distance radially beyond the core and developing crop-receiving pockets therebetween, the gathering reel being closely adjacent the cutter and the fingers are disposed at the periphery of the flighting.

3. A forage harvester according to Claim 2 wherein the gathering means includes a shaft with a plurality of sprockets thereon in the core, the fingers are incorporated in units each including a driven sprocket and a cam for directly actuating the fingers, and the construction includes endless drive chains interconnecting the sprockets in the core and the sprockets in the finger units.

4. A forage harvester according to claim 3 wherein the flighting is of generally hollow construction, and the finger units are effectively incorporated in the hollow interior of the flighting with only the fingers extending therefrom, and the endless drive chains are entirely enclosed in the core and flighting.

5. A forage harvester according to claim 2 wherein the fingers are at all times confined within the peripheral outer limits of the flighting.

6. A forage harvester according to claim 5 wherein the gathering means is of predetermined size and shape, fixed in location, and defining a single outermost projection of movement, and the fingers are at all times contained within such outermost projection and against movement radially therebeyond.

7. A harvester comprising a transverse cutter, a rotatable gathering assembly positioned generally above the cutter, said gathering assembly including an auger having a central hollow core and flighting thereon, the gathering assembly being operative for moving the cut crop plants laterally inwardly from the sides, a plurality of finger units each including two fingers and the units being distributed peripherally around and axially of the gathering assembly, each finger unit being self contained and mounted in the flighting and each including a pair of axially opposed plates, each plate mounting one of the fingers and the fingers being arranged on opposite sides of the unit and movable to active position in which they extend relatively oppositely on a line extending axially of the gathering assembly, and movable to retracted position, the unit including actuating means between the fingers which selectively actuates the fingers to extended position, and for controlling said activating means including means within said hollow core, and itself controlled by rotation of the gathering assembly.

8. A harvester according to claim 7 wherein the auger flighting includes sheeting continuous circumferentially around the gathering head having a base at the core and converging radially outwardly to a closed outer seam defining an inner space with the core, the finger units are detachably mounted at the periphery of the flighting and the axially opposed side plates thereof form continuations of the opposed elements of the increment of flighting in which the unit is mounted, the finger units defining an extension of the space within the flighting.

9. A harvester according to claim 8 wherein the actuating means in each finger unit includes a cam unit rotatable continuously in one direction, and the fingers including cam followers and finger elements arranged so that upon rotation of the gathering head, the cam unit rotates and moves the fingers to active position according to a predetermined shape of the cam in corresponding portions of rotation of the gathering assembly.

10. A harvester according to claim 9 wherein said control means is substantially entirely enclosed in the space within the flighting and core, the plates of the finger unit including flange means in which the fingers are mounted and which have shield means disposed forwardly relative to the direction of rotation of the gathering head shielding the mounting and related elements of the fingers in an arrangement in which the fingers have only elongated elements extending axially therebeyond.

11. In a crop harvester, a finger unit, comprising a pair of opposed plates adapted for mounting in a rigid assembly, a pair of fingers each including a body by which the finger is mounted, an actuating element and a finger element, the fingers being arranged oppositely along an axis extending between the opposed plates and being mounted for movement between an active position in which the finger elements extend generally outwardly from the plates, and a retracted position in which the finger elements extend generally in a direction transverse to said active position, and common actuating means between said plates and reactive between the fingers and operative for moving the fingers to said active position.

12. A finger unit according to claim 11 and including spring means biasing the fingers to retracted position.

13. A finger unit according to claim 11 wherein the elements constitute a self-contained unit, and wherein the side plates are adapted for mounting in a mounting member, and the unit includes a driven component incorporating a rotating driven element, adapted for operative connection with a driving element.

14. A finger unit according to claim 11 wherein the driven component includes a sprocket-cam unit having a cam element and mounted for rotation continuously in a single direction, and the fingers are actuated oppositely by said cam element.

15. A finger unit according to claim 14 wherein each finger includes a body, a finger element and a cam follower, the fingers being arranged for reaction against said cam element and movable thereby correspondingly to active position, the plates including flange means providing a shield extending forwardly of the mounting portions of the fingers whereby to protect them from the movement of the crop being harvested and to provide exposure only of the finger elements extending therebeyond in active position of the fingers.

16. A forage harvester of the character disclosed, comprising from front to rear, a first unit, a second unit and a third unit, the first unit being a standing-crop cutting unit and including a gathering head and a cutter both extending across the effective range of the harvester, the cutter being disposed adjacent the ground and the gathering head being disposed generally above the cutter, the gathering head being in the form of an auger having a core of relatively small radial dimension and flighting of substantially greater radial dimension than the core, the gathering head having its lower edge closely adjacent the cutter, the core of the gathering head being in such position, vertically, as to engage standing crop plants and bias them forwardly in the forward movement of the harvester, the gathering head including a plurality of fingers mounted adjacent its periphery, the fingers being movable between active position in which they extend generally axially of the gathering head and a retracted position in which they extend closely adjacent the flighting elements of the auger, means for moving the fingers into active position when in the lowermost position of the gathering head whereby to positively engage the crop plants and move the butt ends thereof rearwardly against the cutter and therebeyond, the harvester also including a platform leading rearwardly from the cutter and reacting against the gathering head and cooperative therewith for moving the crop plants after being cut by the cutter, rearwardly into the second unit, the second unit being operative for transmitting the cut crop plants into the third unit, and the third unit being operative for transmitting the cut plants rearwardly therefrom.

17. A forage harvester according to claim 16 wherein the platform at its forward end and immediately rearwardly of the cutter having a portion curved correspondingly to and closely adjacent the gathering head and leading to another portion of the platform adjacent the second unit, the means for moving the fingers being operative for maintaining them in extended position throughout their movement from a position forwardly of the cutter means continuously past the cutter means and along the curved portion of the platform.

18. A forage harvester according to claim 17 wherein the fingers when retracted are in trailing position relative to the direction of rotation of the gathering head, and they move into such trailing position at a position rotationally of the gathering head within the uppermost limit of the mass of cut crop plants moving generally horizontally from the gathering head to the second unit.

19. A harvester comprising a transverse cutter, a transverse gathering head in the form of an auger having transversely spaced sections oppositely arranged for gathering cut crop plants laterally inwardly toward an intermediate position, and the auger including flighting in the two sections terminating at said intermediate passage in a common terminal point, a plurality of fingers mounted in the flighting in the periphery thereof and movable between an active position in which the fingers extend transversely of the flighting and axially of the auger, and a retracted position in which they extend in trailing direction relative to the direction of rotation of the auger, the fingers in the aggregate and considered circumferentially the auger being staggered and overlapping axially whereby all increments of length of the cutter are covered by the fingers collectively, and the harvester having a platform reacting with the gathering head and cooperable therewith for feeding the crop plants rearwardly pursuant to their being cut, and the harvester having a rearwardly directed opening longitudinally in line with said intermediate position for receiving the cut plants.

* * * * *